(12) United States Patent
Jang et al.

(10) Patent No.: US 6,801,493 B2
(45) Date of Patent: Oct. 5, 2004

(54) OPTICAL PICKUP DEVICE

(75) Inventors: Dong-seob Jang, Seoul (KR); Sung-jin Lee, Gyeonggi-do (KR); Gyu-chan Jun, Seoul (KR); Young-min Cheong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 333 days.

(21) Appl. No.: 10/051,301

(22) Filed: Jan. 22, 2002

(65) Prior Publication Data

US 2002/0186645 A1 Dec. 12, 2002

(30) Foreign Application Priority Data

Jun. 8, 2001 (KR) ......................................... 2001-31969

(51) Int. Cl.[7] ........................ G11B 17/30; G11B 21/02; G11B 7/00; G11B 17/00; G11B 21/16
(52) U.S. Cl. ................. 369/221; 369/52.28; 369/44.15; 369/244.1; 720/659
(58) Field of Search ........................ 369/52.28, 44.15, 369/244, 221, 44.16, 44.14, 44.11, 43, 53.23, 219, 215, 176; 720/659

(56) References Cited

U.S. PATENT DOCUMENTS

| | | | | |
|---|---|---|---|---|
| 4,685,767 A | * | 8/1987 | Ueshiba et al. | 359/824 |
| 5,247,503 A | * | 9/1993 | Nomiyama et al. | 369/44.35 |
| 6,125,008 A | * | 9/2000 | Berg et al. | 360/264.4 |
| 6,288,985 B1 | * | 9/2001 | Jordache et al. | 369/44.23 |

* cited by examiner

Primary Examiner—Julie Anne Watko
(74) Attorney, Agent, or Firm—Staas & Halsey LLP

(57) ABSTRACT

An optical pickup device including a slider on which an objective lens is mounted and which is elastically movably supported by a support member, an air bearing member provided in the slider so that a lifting force pushes the slider away from the disk according to air flow generated during rotation of the disc, and an actuator to change the position of the objective lens mounted on the slider in a focus direction relative to the disc. In the optical pickup device, the slider is lifted from a disk using a lifting force acting on the air bearing member and simultaneously the position of an objective lens is adjusted by a piezoelectric device to perform focus control. Therefore, collision between a disk and an objective lens is avoided, and a focal position is effectively controlled just by changing only the position of the objective lens, thereby increasing the reliability of a recording and/or reproducing operation.

15 Claims, 10 Drawing Sheets

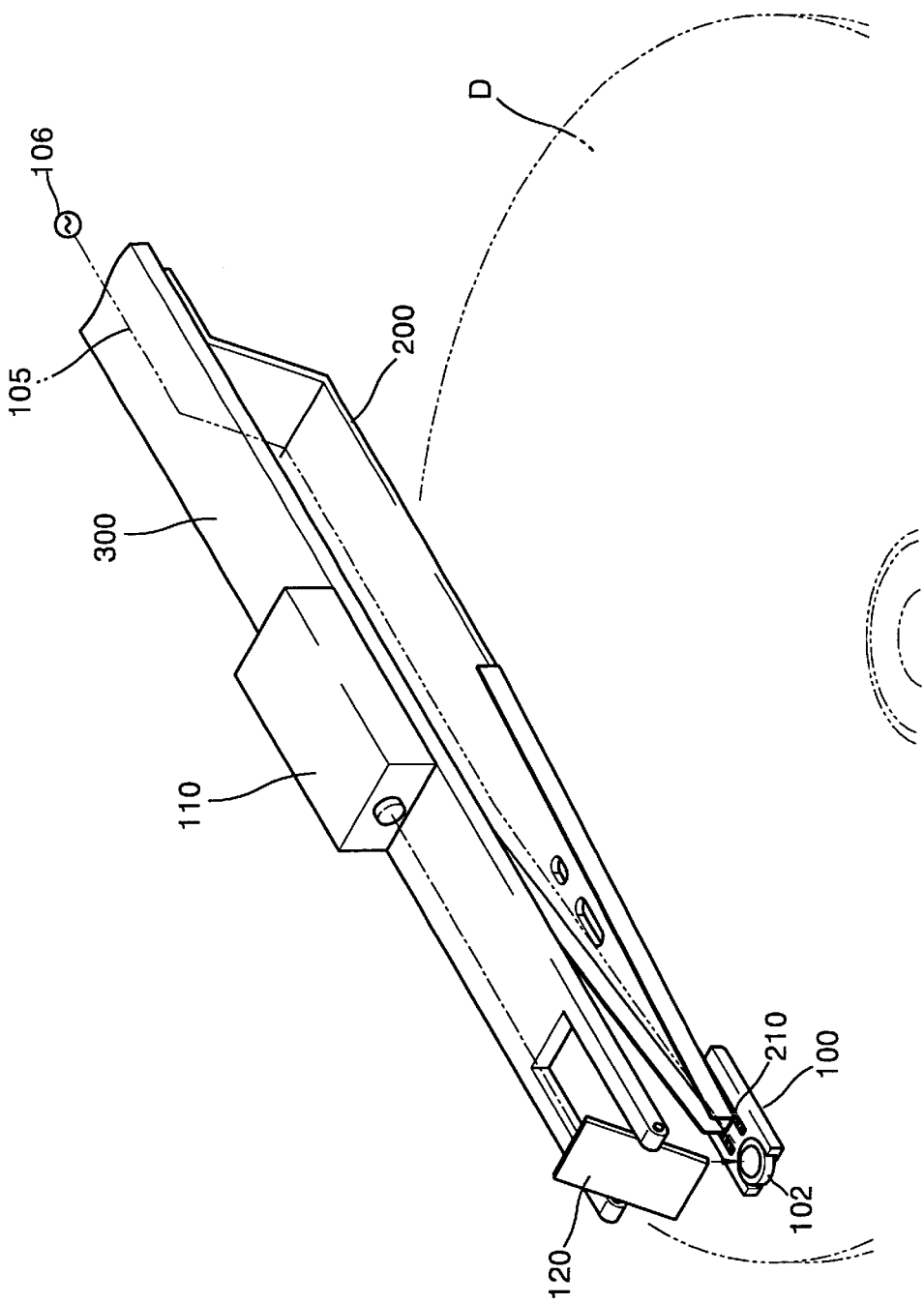

OPTICAL PICKUP DEVICE

CROSS-REFERENCE TO RELATED APPLICATIONS

This application claims the benefit of Korean Patent Application No. 2001-31969 filed on Jun. 8, 2001, in the Korean Industrial Property Office, the disclosure of which is incorporated herein by reference.

BACKGROUND OF THE INVENTION

1. Field of the Invention

The present invention relates to an optical pickup device used to record information on a disk or to reproduce information from a disk, and more particularly, to an optical pickup device using an air bearing slider that can control positioning of the optical pick-up device.

2. Description of the Related Art

In general, an optical recording and/or reproducing apparatus to record and/or reproduce information to and/or from a disk, which is an optical recording medium, for example, a compact disk player (CDP) or a digital versatile disk player (DVDP), includes an optical pickup device which radiates light onto a recording surface of the disk and receives light reflected from the disk while moving in a radial direction of the disk, thereby recording and/or reproducing information to and/or from the disk. As shown in FIG. 1, a conventional optical pickup device includes a holder 8 fixed to a base 7, a bobbin 2 movably supported by elastic supports 6a through 6d whose ends are fixed to the holder 8, an objective lens 1 mounted on the bobbin 2, a focus coil 3 and tracking coils 4 installed at the bobbin 2 to drive the objective lens 1 in focusing directions "A" and in tracking directions "B" to form an electrical connection path, magnets 10 and yokes 9 generating electromagnetic forces to drive the bobbin 2 by interacting with the current flowing in the respective coils 3 and 4.

In the above-described configuration, if current is supplied to the focus coil 3, the bobbin 2 supported by the elastic supports 6a through 6d is driven in one of the focus directions "A" by the electromagnetic force generated by interaction between the current and the magnetic force based on the magnets 10 and the yokes 9. Thus, while controlling the current flowing through the focus coil 3, the focal distance between the recording surface of a disk (not shown) and the objective lens 1 can be controlled. Also, the bobbin 2 is driven in the tracking directions "B" by electromagnetic force generated by controlling current flowing through the tracking coils 4, thereby controlling the objective lens 1 to follow a desired track of the disk.

As there has recently been increasing demand for high-capacity recording media, high-density disks having small track pitches are being developed. In order to smoothly record information on and/or reproduce information from a high-density disk having a narrow track pitch, optical pickup devices tend to employ an objective lens having a high numerical aperture (NA) of 0.8 or greater. However, a drawback in employing a high-density disk and a high NA objective lens is that the focal distance between the objective lens 1 and the disk is considerably reduced to 0.2 mm or less. In other words, a high NA objective lens has a focal length of only 0.1 to 0.2 mm. In the case of employing the conventional optical pickup device shown in FIG. 1, the focal distance is so short that the objective lens 1 and the disk are liable to collide during focus control. Also, the large inertia of the bobbin 2 having the objective lens 1, the focus coil 3 and the tracking coils 4 mounted thereon limits the focusing and tracking precision of the optical pickup device shown in FIG. 1. Thus, the optical pickup device shown in FIG. 1 can be used without limitation in a system using a general disk or objective lens in which the focal distance is in the range of several millimeters, while in a system using a high-density disk or high NA objective lens in which the focal distance is in the range of 0.1 to 0.2 millimeters, the system is severely affected by inertia so that the objective lens 1 is liable to collide with the recording surface of a disk during focus control, which may cause damage to both the disk and the objective lens 1.

To solve the above-mentioned problem, there has been proposed an optical pickup device shown in FIG. 2 which is constructed such that an objective lens 22 is mounted on an air-bearing slider 21 elastically biased so as to securely contact a recording surface of a disk 23 initially by mechanical elasticity of a rotary actuator 20. If the disk 23 rotates, the air-bearing slider 21 is subjected to a lifting force so that it is lifted from the recording surface of the disk 23 and its focal position is maintained at a level where the lifting force is balanced by the elasticity of the actuator 20. Thus, in such a construction, since a gap is always maintained by air pressure formed between the slider 21 and the recording surface of the disk 23, collision of the objective lens 22 and the disk 23 never happens.

However, according to the above-described construction, since the focal position depends on the lifting force acting on the air bearing slider and the elasticity of the actuator 20, accurate focus control is not possible, lowering reliability of recording and/or reproducing.

Thus, there is a high demand for a novel optical pickup device that can overcome such problems.

SUMMARY OF THE INVENTION

Accordingly, it is an object of the present invention to provide an improved optical pickup device which can perform focus control with a high-density disk in a stable manner.

Additional objects and advantages of the invention will be set forth in part in the description which follows and, in part, will be obvious from the description, or may be learned by practice of the invention.

The foregoing and other objects of the present invention are achieved by providing an optical pickup device including a slider on which an objective lens is mounted and which is elastically and movably supported by a predetermined support member, an air bearing member provided on the slider creating a lifting force to push the slider away from the disk according to air flow generated during rotation of the disc, and an actuator to change the position of the objective lens mounted on the slider in a focus direction relative to the disc.

The foregoing and other objects of the present invention may also be achieved by providing that the actuator includes a piezoelectric device installed in the slider to change the position of the objective lens by being reversibly deformed according to voltage application.

BRIEF DESCRIPTION OF THE DRAWINGS

These and other objects and advantages of the present invention will become apparent and more readily appreciated from the following description of the embodiments, taken in conjunction with the accompanying drawings of which:

FIG. 3 illustrates an optical pickup device according to an embodiment of the present invention;

DETAILED DESCRIPTION OF THE PREFERRED EMBODIMENTS

Figure 1:
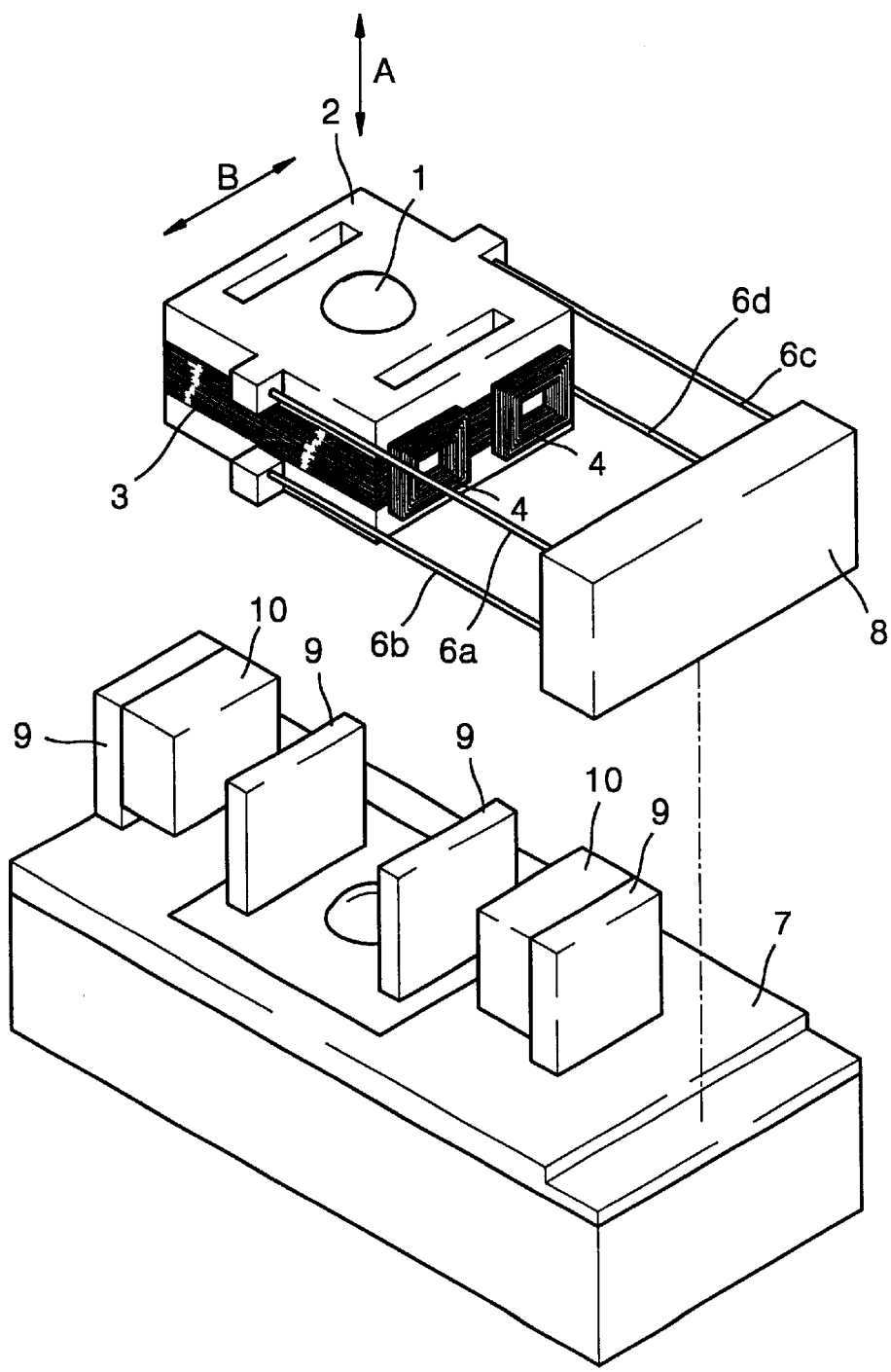
FIG. 1 illustrates a conventional optical pickup device.
Figure 2:
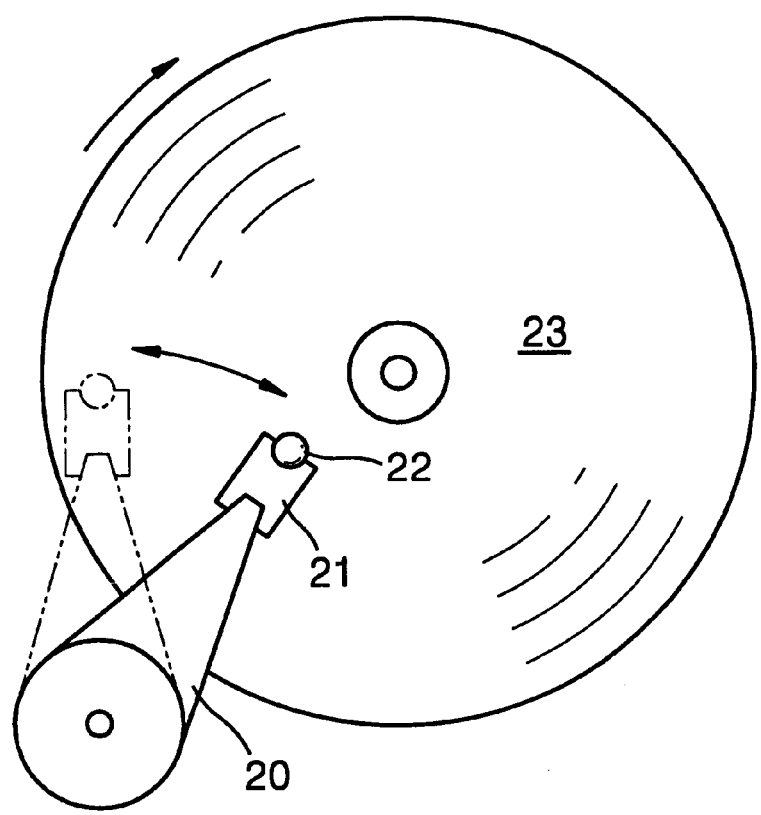
FIG. 2 illustrates another conventional optical pickup device.
Figure 4A:
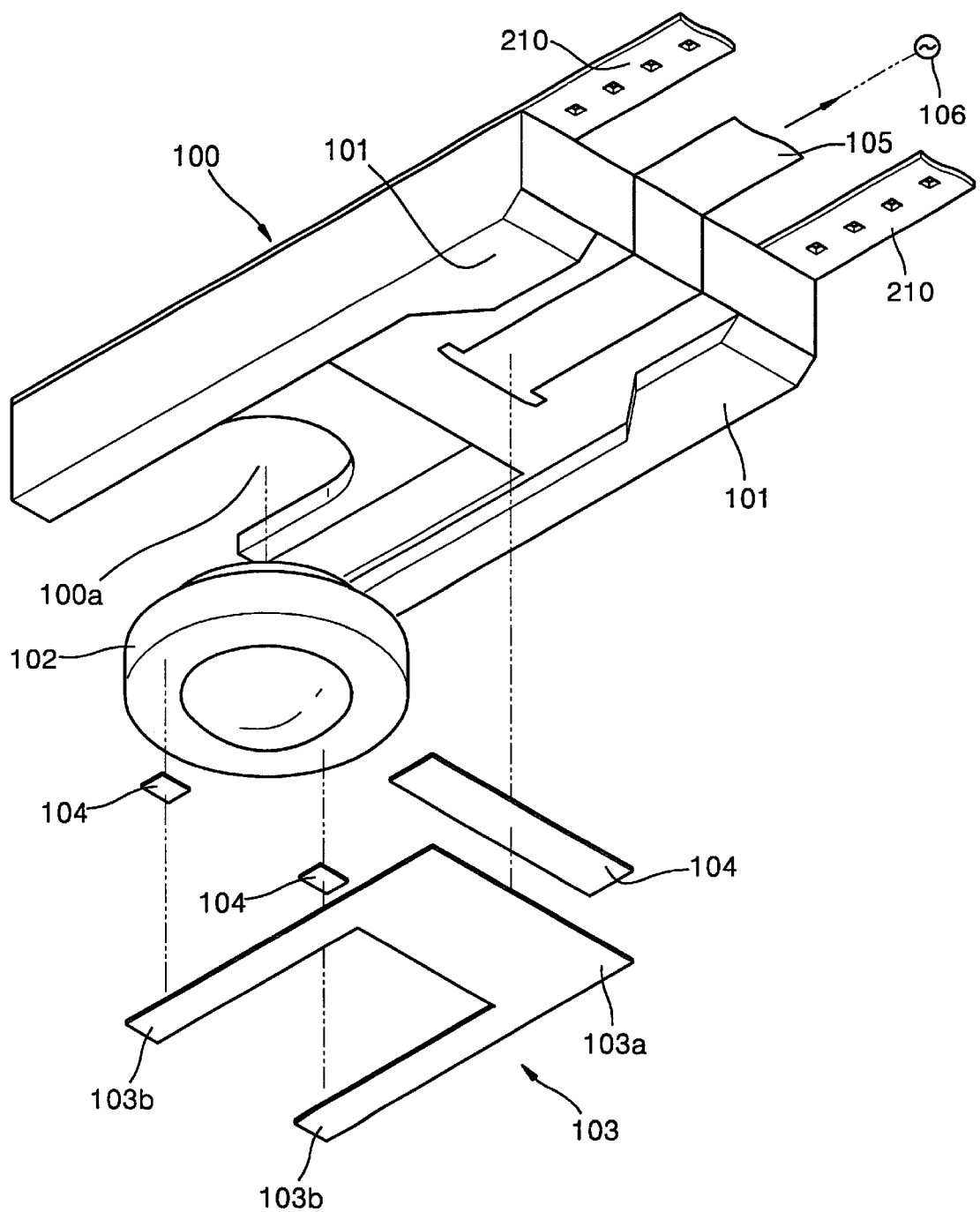
FIG. 4A is an exploded view of essential parts of the optical pickup device shown in FIG. 3.
Figure 4B:
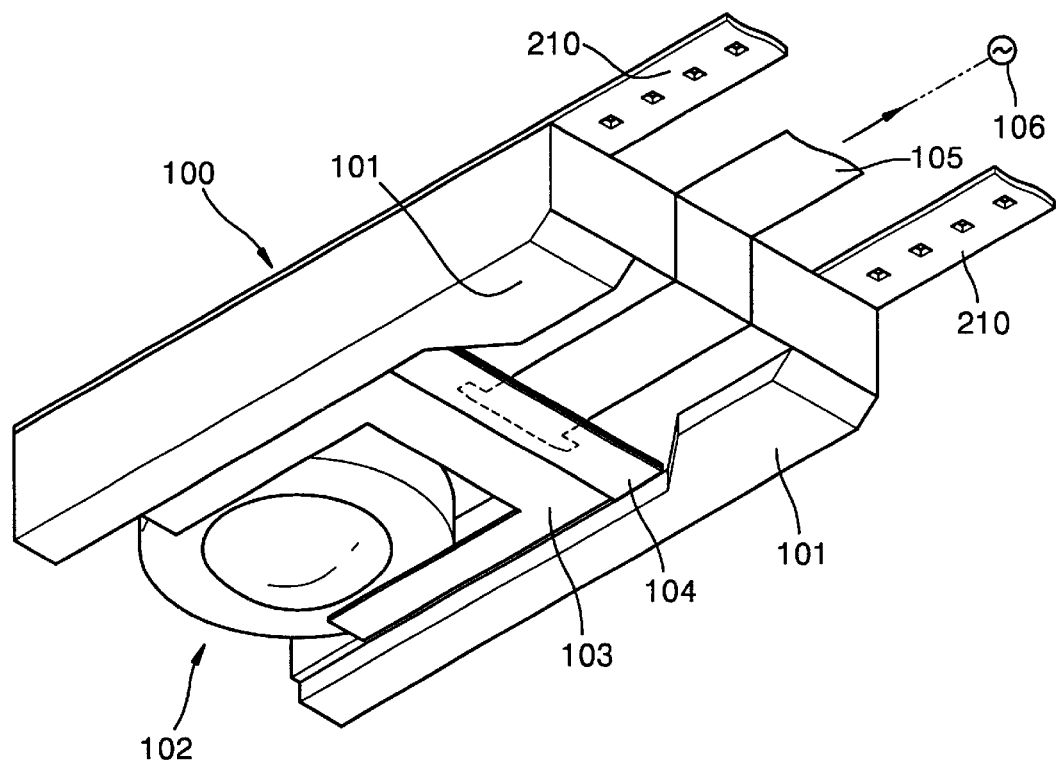
FIG. 4B is a view of the parts illustrated in FIG. 4A in an assembled state.
Figure 5:
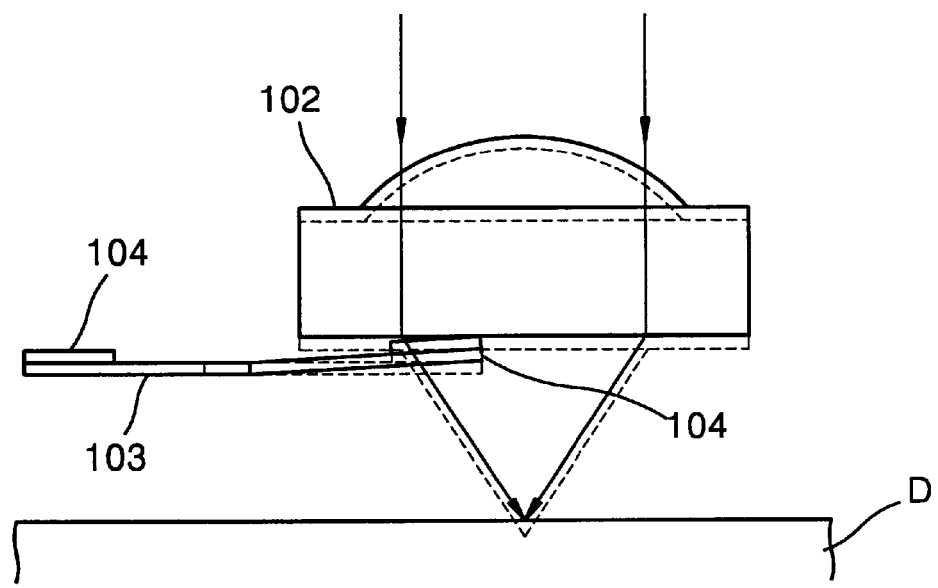
FIG. 5 illustrates a focus control operation of the optical pickup device shown in FIG. 3.

FIGS. 3 through 5 illustrate an optical pickup device according to an embodiment of the present invention. Referring thereto, a suspension 200 which is an elastic support member is installed on a movable bar 300 rotating over a disk D, and a slider 100 having an objective lens 102 mounted thereon is installed at one end of the suspension 200. Reference numeral 210 denotes an elastic piece connecting the suspension 200 with the slider 100. As shown in FIGS. 4A and 4B, an air bearing member 101 to allow a lifting force to act by air flow occurring during rotation of the disk D is provided at the bottom surface of the slider 100, that is, at the surface facing the disk D. Thus, if air flow occurs around the disk D in accordance with rotation of the disk D, the air strikes the air bearing member 101 to create a lifting force pushing the slider 100 away from the disk D. Reference numeral 103 denotes a piezoelectric element reversibly deformable by voltage application. A first end 103a of the piezoelectric element 103 is fixedly adhered to the slider 100 with an adhesive pad 104 interposed therebetween, and a second end 103b of the piezoelectric element 103 is fixed to one end of the bottom surface of the objective lens 102 installed in an opening 100a of the slider 100 to support the objective lens 102. Thus, if a voltage is applied from a voltage applying unit having a power source 106 and a voltage applying line 105, the second end 103b of the piezoelectric element 103 is deformed to elevate the objective lens 102. When the voltage is removed, the piezoelectric element 103 returns to its original position, thus reversing the effect of deformation. The piezoelectric element 103 according to this embodiment is a bimorph type piezoelectric film, and can be formed into a size of 25 mm in width, 32.5 mm in length and 104 μm in thickness, for example, and then, after it is installed, a voltage of ±100 V is applied to obtain an elevation variation of ±10 μm. Reference numeral 120 denotes a reflection mirror installed on the movable bar 300 to allow light emitted from an optical system 110 to be radiated on the disk D through the objective lens 102 and serves to change the path inducing the light reflected therefrom back to the optical system 110.

In the optical pickup device having the above-described configuration, if the disk D rotates to record and/or reproduce, air flow occurs around the disk D and the air bearing member 101 is subjected to a lifting force by the flowing air. Thus, in a state in which the slider 100 is elastically supported by the suspension 200, the slider 100 is lifted and spaced a predetermined distance apart from the disk D. Here, the distance is approximately 0.1 to approximately 0.2 mm. In the optical pickup device using a high NA objective lens, the focal distance is generally determined within this range. In such a state, when the recording and/or reproducing of the optical disk starts, light is radiated from the optical system 110 to the disk D and simultaneously the objective lens 102 is elevated by a piezoelectric device having the piezoelectric element 103 to perform focus control. In other words, an appropriate voltage is applied to the piezoelectric element 103 by the voltage applying unit including the voltage applying line 105 and power source 106 according to a focus error signal detected by a controller (not shown) of a recording and/or reproducing apparatus through the optical system 110. Accordingly, as shown in FIG. 5, the second end 103b (see FIG. 4A) of the piezoelectric element 103 is reversibly deformable to change the position of the objective lens 102 towards or away from the optical disk. Thus, the focal position of a beam incident from the optical system 110 through the objective lens 102 is adjusted, thereby achieving focus control.

In the optical pickup device according to the present invention, while maintaining a small gap of approximately 0.1 to approximately 0.2 mm between the objective lens 102 and the disk D using the air bearing member 101, focus control is performed just by adjusting the position of the objective lens 102 using an actuator employing the piezoelectric element 103. Thus, focus control can be effectively performed while avoiding collision between the objective lens 102 and the disk D.

FIGS. 6 through 9A and 9B show an optical pickup device according to another embodiment of the present invention, in which the same reference numerals as those shown in the previous embodiment denote the same functional elements.

Figure 6:
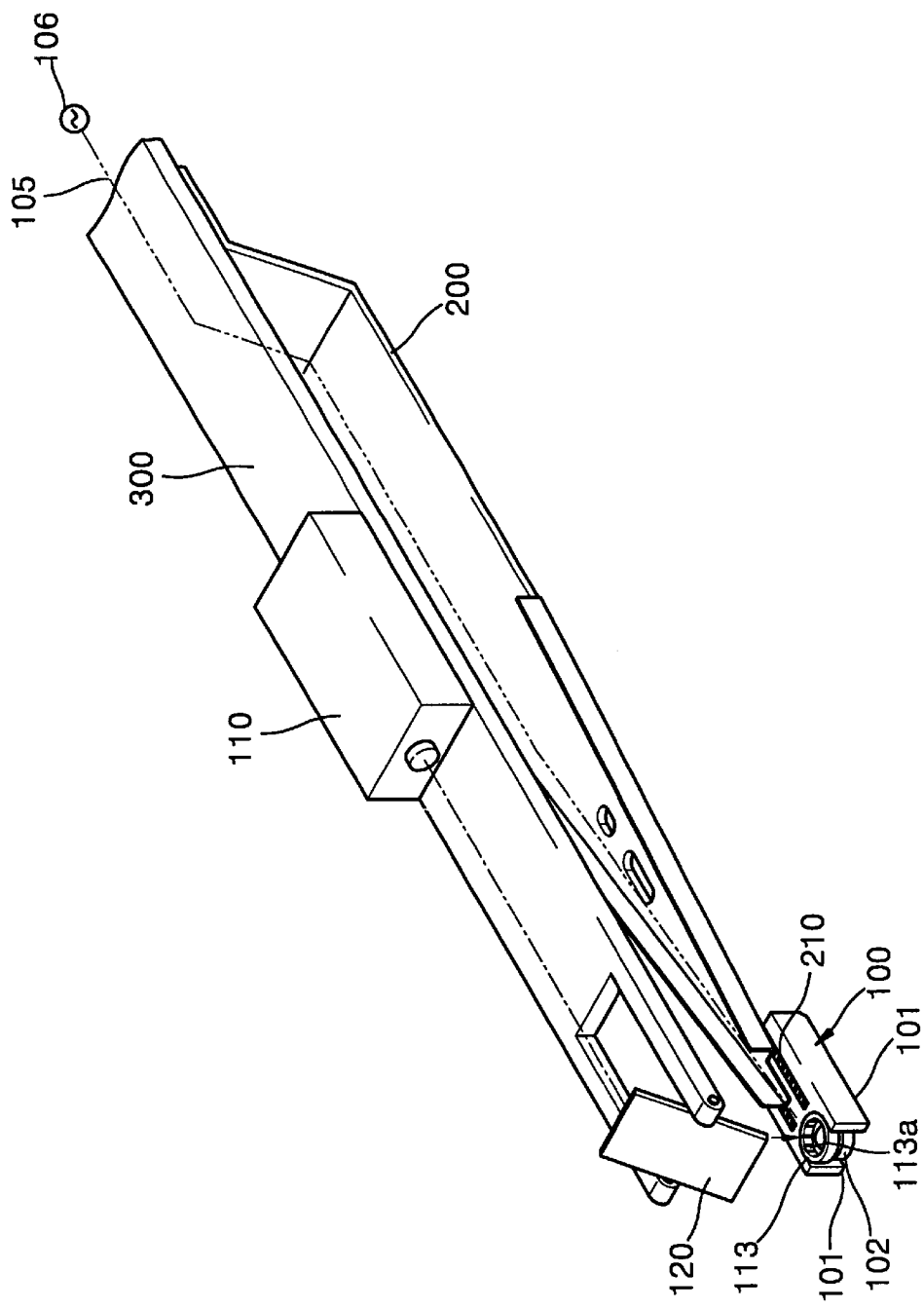
FIG. 6 illustrates an optical pickup device according to another embodiment of the present invention.
Figure 7:
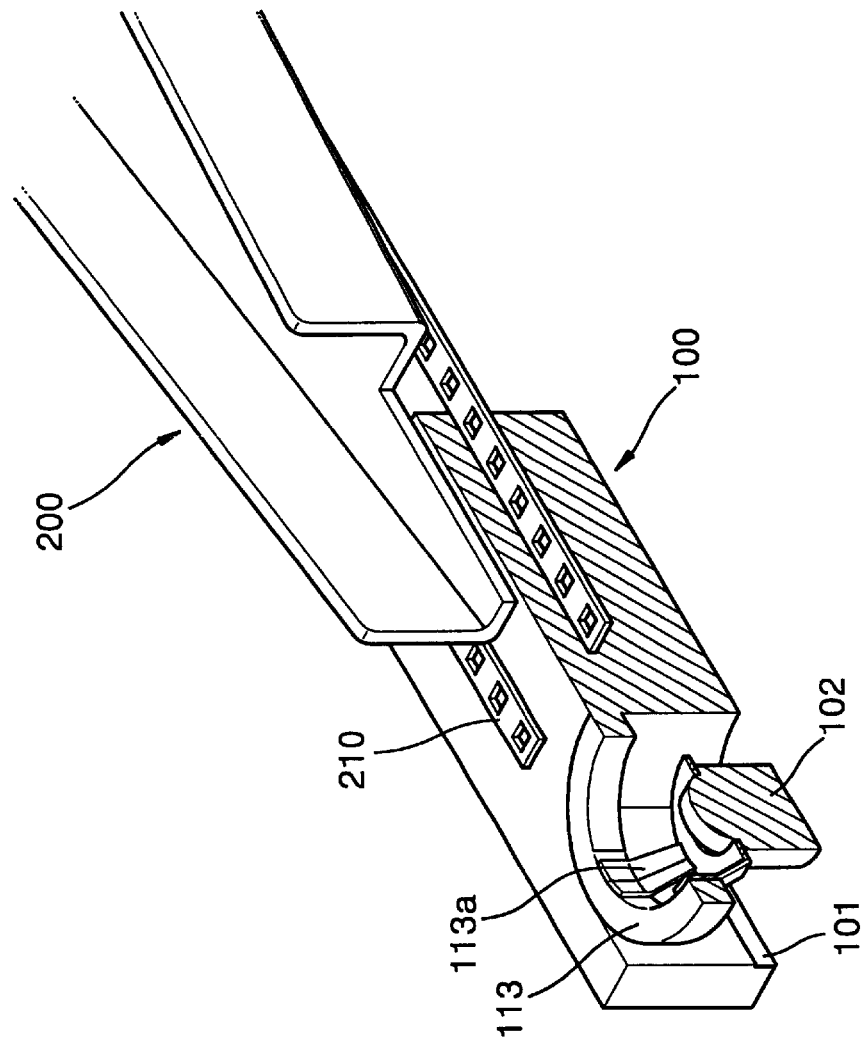
FIG. 7 is a partially cut-away view illustrating essential parts of the optical pickup device shown in FIG. 6.
Figure 8A:
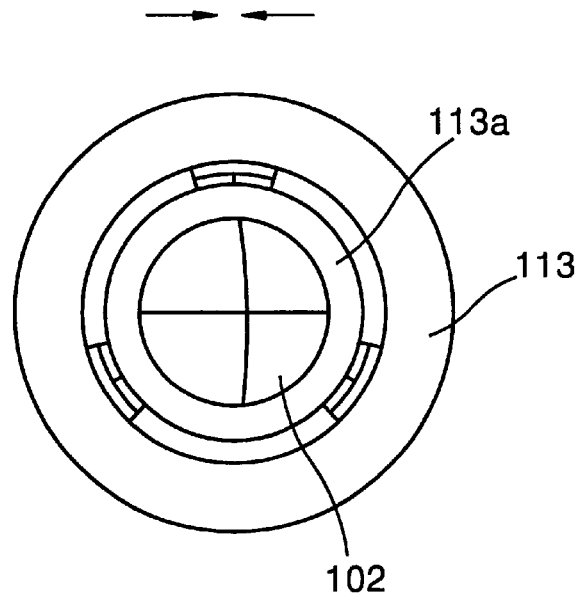
FIGS. 8A, 8B, 9A and 9B illustrate a focus control operation of the optical pickup device shown in FIG. 6.
Figure 8B:
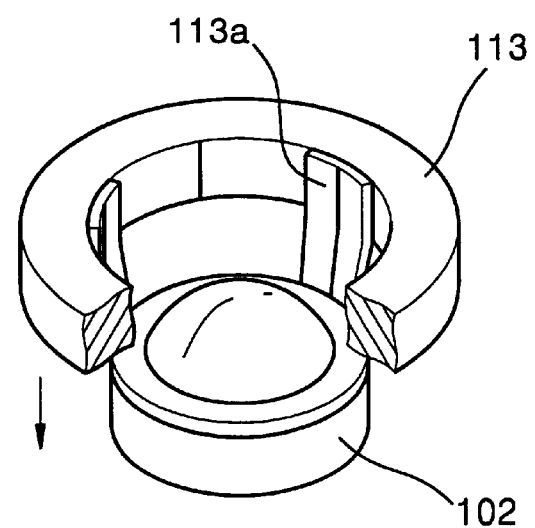
Figure 9A:
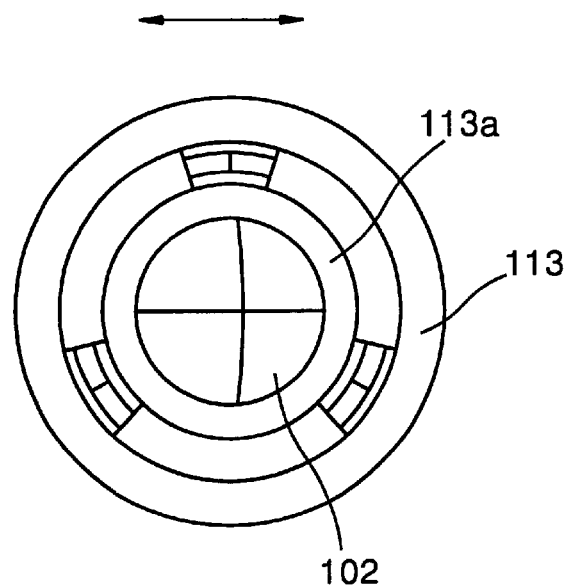
Figure 9B:
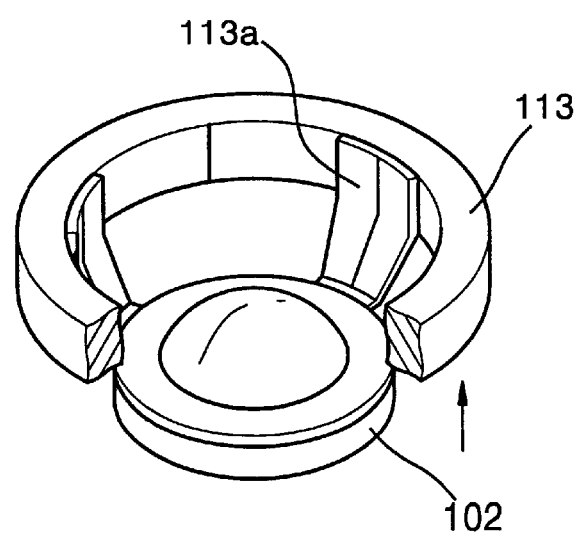

According to this embodiment of the present invention, as shown in FIGS. 6 and 7, an annular piezoelectric element 113 is employed in an actuator to provide focus control and an objective lens 102 contacts and is connected and supported by a plate spring support 113a connected to the annular piezoelectric element 113. The annular piezoelectric element 113 is a monolithic piezoelectric element, and its diameter changes, that is, it contracts or expands, according to voltage application. Thus, if the diameter of the annular piezoelectric element 113 is reduced, as shown in FIG. 8A, the plate spring support 113a is also elastically deformed, as shown in FIG. 8B, so that the position of the objective lens 102 is lowered. Conversely, if the diameter of the annular piezoelectric element 113 is increased, as shown in FIG. 9A, the position of the objective lens 102 is raised, as shown in FIG. 9B. In other words, according to this embodiment, focus control is performed by elevating and lowering the objective lens 102 by changing the diameter of the annular piezoelectric element 113.

In the optical pickup device having the above-described configuration, recording and/or reproduction and focus control are performed in the same manner as in the previous embodiment of the present invention. However, according to the present embodiment, the position of the objective lens 102 can also be controlled by a piezoelectric device including an annular piezoelectric element 113 and the plate spring support 113a. Therefore, collision between the objective lens 102 and the disk D can be avoided by an air bearing force, and focus control can also be effectively performed by changing the position of the objective lens 102, thereby increasing the reliability of a recording and/or reproducing operation.

As described above, in the optical pickup device according to the present invention, a slider is lifted from a disk using a lifting force acting on an air bearing portion and simultaneously the position of an objective lens is adjusted by a piezoelectric device to perform focus control. Therefore, collision between a disk and an objective lens can be avoided, and a focal position can be effectively controlled just by changing only the position of the objective lens, thereby increasing the reliability of the recording and/or reproducing operation.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical pickup device to record and/or reproduce information on and/or from an optical disk, comprising:
    an elastic support member;
    an elastic piece attached to the elastic support member;
    a slider on which an objective lens is mounted and which is elastically mounted to the elastic piece and movably supported by a the elastic support member;
    an air bearing member, provided within the slider, creating a lifting force to push the slider away from the disk according to air flow generated during rotation of the disk; and
    an actuator changing the position of the objective lens mounted on the slider in a focus direction relative to the disk.

2. The optical pickup device of claim 1, wherein the actuator comprises a piezoelectric device installed within the slider to change the position of the objective lens by being reversibly deformable according to voltage application.

3. The optical pickup device of claim 2, further comprising a first adhesive piece,
    wherein the piezoelectric device comprises:
        a piezoelectric element having a first end fixed to the slider with the first adhesive piece therebetween and a second end contacting the objective lens; and
        a voltage applying unit applying a voltage to the piezoelectric element so that the second end thereof is reversibly deformable to move the objective lens in the focus direction.

4. The optical pickup device according to claim 3, further comprising a second adhesive pad,
    wherein the second end of said piezoelectric element is connected to said objective lens with the second adhesive pad therebetween.

5. The optical pickup device of claim 2, wherein the piezoelectric device comprises:
    an annular piezoelectric element installed within the slider to contract or expand in a radial direction,
    a support having a first end fixed to the first end of the piezoelectric element and a second end contacting and supporting the objective lens; and
    a voltage applying unit applying a voltage so as to cause the piezoelectric element to be radially deformed to move the objective lens in the focus direction.

6. The optical pickup device according to claim 4, further comprising a second adhesive pad,
    wherein the second end of said piezoelectric element is connected to said objective lens with the second adhesive pad therebetween.

7. The optical pickup device according to claim 2, wherein the piezoelectric device is a bimorph type piezoelectric film.

8. The optical pickup device according to claim 7, wherein the piezoelectric device is formed into a size of 25 mm in width, 32.5 mm in length and 104 $\mu$m in thickness.

9. The optical pickup device according to claim 7, wherein one end of said piezoelectric device is a plate spring support.

10. The optical pickup device according to claim 1, further comprising
    an optical system to emit light; and
    a mirror to reflect the light in a direction of the objective lens.

11. The optical pickup device according to claim 10, further comprising a movable bar, wherein the optical system, the mirror and the elastic support member are attached to the movable bar.

12. An optical pickup device to record and/or reproduce information on and/or from an optical disk, comprising:
    a movable bar having an optical system mounted thereon to emit light and a reflecting mirror mounted at one end of the movable bar to reflect the emitted light onto the optical disk;
    a suspension extending from said movable bar; and
    a slider elastically mounted on said suspension, said slider comprising:
        an objective lens mounted elastically and movably thereon such that the reflected light passes through said objective lens between the optical system and the optical disk;
        an air bearing member mounted thereon to create a force between the optical disk and said slider; and
        an actuator having a first end connected to said slider and a second end connected to said objective lens to move said objective lens in a focus direction with respect to the optical disk to adjust the focus of the reflected light on the optical disk.

13. The optical pickup device according to claim 12, wherein said actuator comprises a piezoelectric element that is reversibly deformable by applying a voltage thereto.

14. A slider to be used with an optical pickup device to record and/or reproduce information on and/or from an optical disk, comprising:
    a slider body;
    a plate spring attached to the slider body;
    an objective lens mounted elastically with the plate spring to the slider body and movably movable with respect to the slider body;
    a first unit to create a lifting force on said slider with respect to the disk; and
    a second unit to create a moving force to said objective lens to move the objective lens with respect to said slider body.

15. The slider according to claim 14, wherein the objective lens is mounted within an opening at one end of the slider body, and the objective lens is movable with respect to walls of the opening.

* * * * *

UNITED STATES PATENT AND TRADEMARK OFFICE
CERTIFICATE OF CORRECTION

PATENT NO. : 6,801,493 B2
DATED : October 5, 2004
INVENTOR(S) : Dong-seob Jang et al.

It is certified that error appears in the above-identified patent and that said Letters Patent is hereby corrected as shown below:

Column 5,
Line 22, remove "a"

Column 6,
Line 52, remove "movably".

Signed and Sealed this

Eighteenth Day of January, 2005

JON W. DUDAS
*Director of the United States Patent and Trademark Office*